United States Patent [19]

Wells

[11] 3,916,707

[45] Nov. 4, 1975

[54] CENTRIFUGAL PULLEY WITH MOVABLE FLANGE SUPPORTED BY ROLLERS ON A SQUARE SHAFT

[76] Inventor: David L. Wells, P.O. Box 593, Dubois, Wyo. 82513

[22] Filed: Sept. 26, 1974

[21] Appl. No.: 509,994

[52] U.S. Cl. .................................... 74/230.17 E
[51] Int. Cl.² ...................................... F16H 55/52
[58] Field of Search ............ 74/230.17 E, 230.17 B, 74/230.17 C, 230.17 D, 230.17 R, 217 CV

[56] References Cited
UNITED STATES PATENTS

| | | | |
|---|---|---|---|
| 2,812,666 | 11/1957 | Huck | 74/230.17 C |
| 3,383,934 | 5/1968 | Flynn | 74/230.17 C |
| 3,400,600 | 9/1968 | Ruprecht et al. | 74/230.17 C |
| 3,434,363 | 3/1969 | Ruprechet | 74/230.17 C |
| 3,808,900 | 5/1974 | Vadeboncoeur et al. | 74/230.17 E |

Primary Examiner—Benjamin W. Wyche
Assistant Examiner—Allan R. Burke
Attorney, Agent, or Firm—Robert K. Rhea

[57] ABSTRACT

A variable ratio centrifugal clutch including first and second pulley flanges affixed to a drive shaft. The second pulley flange is supported by bearing equipped assemblies and is axially movable toward and away from the first pulley flange along platforms surrounding the drive shaft. Spring means normally bias the pulley flanges apart. A housing surrounds the bearing assemblies and forms a cam surface for flyweights mounted on the bearing assemblies for forcing the second pulley flange toward the first pulley flange in response to centrifugal force generated by increased drive shaft speed causing the flyweights to bear against the cam surface and bias the second pulley flange toward the first pulley flange.

4 Claims, 5 Drawing Figures

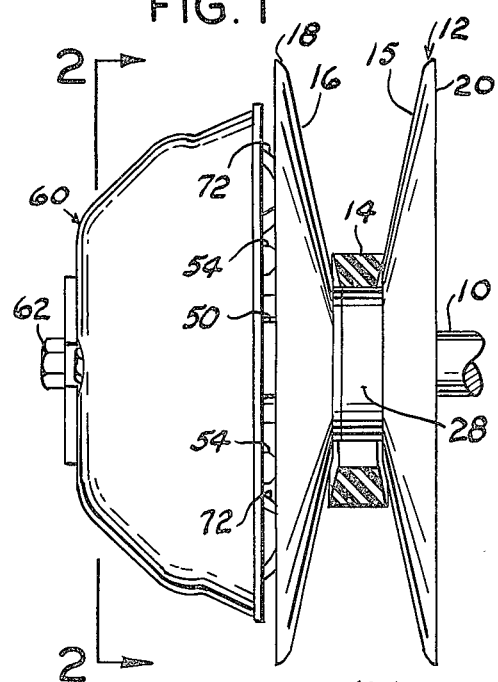
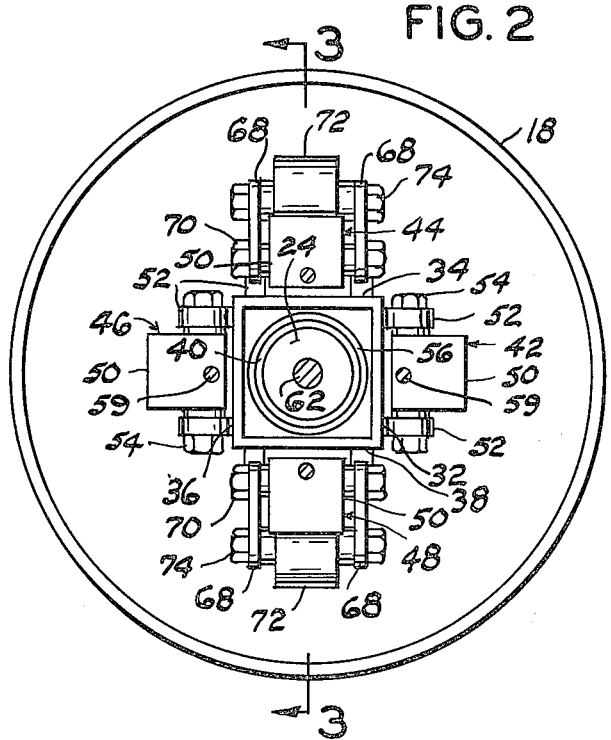
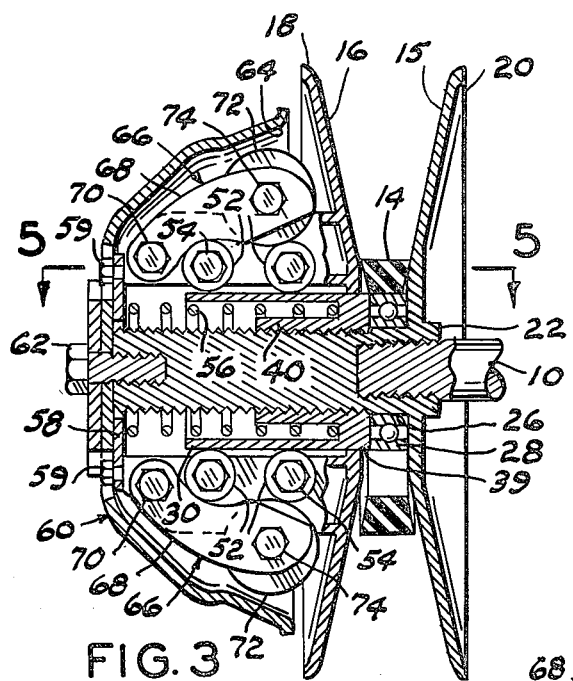
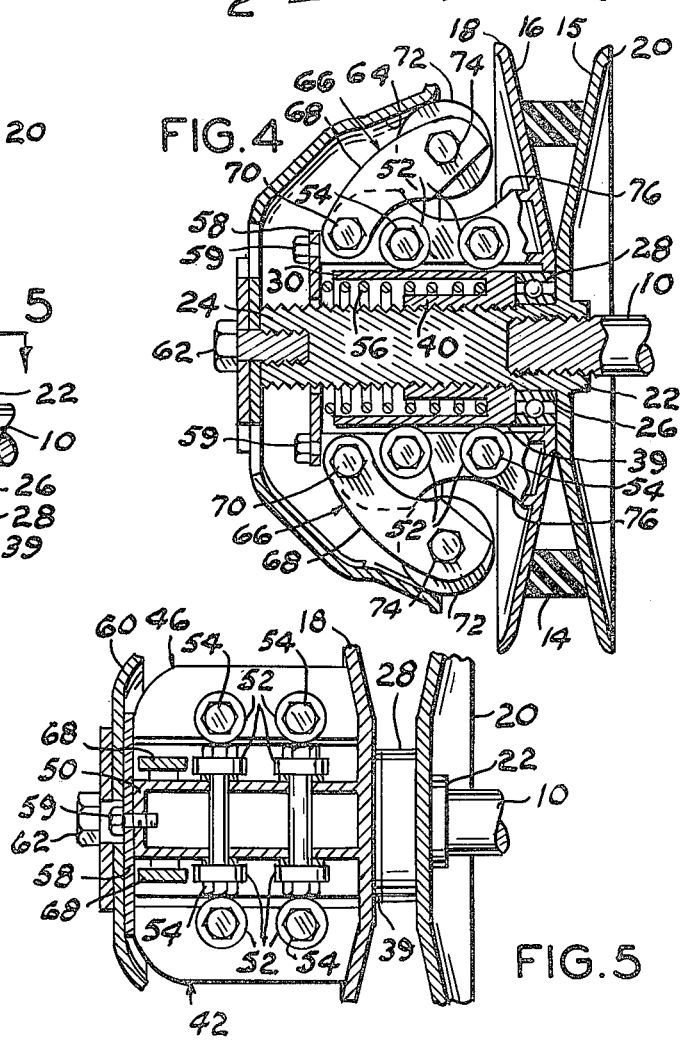

3,916,707

CENTRIFUGAL PULLEY WITH MOVABLE FLANGE SUPPORTED BY ROLLERS ON A SQUARE SHAFT

BACKGROUND OF THE INVENTION

1. Field of the Invention

The present invention relates to centrifugal clutches and more particularly to a variable speed V-belt transmission for transmitting power from a driving shaft to a driven shaft in accordance with the speed of the driving shaft.

Variable ratio centrifugal clutch assemblies used on tracked vehicles, such as snowmobiles, generally comprise a split sheave or pulley with a first flange of the pulley affixed to the driving shaft and the other or second flange being mounted on a sleeve coaxial with the first pulley flange and having flyweights secured to the movable flange which, under increased speed of the driving shaft, are forced outwardly against the inner surface of a surrounding cam forming housing to move the movable pulley flange toward the stationary pulley flange. The second pulley flange and its components thus slide axially along the periphery of the sleeve with the resultant coefficient of friction in time increasing is a result of insufficient lubrication and wear thus resisting movement of the movable flange toward its stationary counter-part. This results in the necessity of increasing the speed of the engine driving the driving shaft in order to achieve the desired spacing between the pulley flanges to grip and drive the V-belt.

This invention reduces the coefficient of sliding friction, in the movement of the movable pulley flange and its assembly toward the stationary flange, to a minimum by supporting the movable pulley flange and its components, including flyweights, by a rolling bearing assembly movable toward and away from the stationary flange on platform surfaces surrounding and parallel with the axis of the driving shaft.

SUMMARY OF THE INVENTION

The invention, in combination with a driving shaft, includes a pair of pulley flanges with a first one of the pair of flanges being mounted on the drive shaft and the second flange of the pair being mounted on rolling bearing means for moving the second flange axially toward and away from the first flange and provide a groove for a V-belt and vary the radial position of the V-belt with respect to the pulley flanges in accordance with the speed of the driving shaft. This is accomplished by platform forming race means axially secured to the drive shaft and rolling bearing assemblies secured to the surface of the second pulley flange opposite the first pulley flange for rolling movement on the respective platforms toward and away from the first pulley flange. A cup-shaped housing, coaxially secured to the drive shaft, includes an arcuate wall projecting toward the adjacent face of the second pulley flange in surrounding relation with respect to the rolling bearing assemblies. Flyweights, secured to the bearing assemblies within the housing, when forced outwardly by centrifugal force, move the second pulley flange toward the first pulley flange.

The principal object of this invention is to provide a variable ratio centrifugal clutch for snowmobiles, or the like, having antifriction bearing means supporting a movable pulley flange for reudcing the coefficient of sliding friction of the movable pulley flange to a minimum.

BRIEF DESCRIPTION OF THE DRAWINGS

FIG. 1 is an elevational view of the clutch in idling position;

FIG. 2 is a left end elevational view of FIG. 1 with the flyweight cam housing removed for clarity;

FIG. 3 is a vertical cross sectional view taken substantially along the line 3—3 of FIG. 2 with the flyweight cam housing in place;

FIG. 4 is a view similar to FIG. 3 illustrating the clutch in V-belt driving position; and, FIG. 5 is a fragmentary horizontal sectional view taken substantially along the line 5—5 of FIG. 2.

DESCRIPTION OF THE PREFERRED EMBODIMENT

Like characters of reference designate like parts in those figures of the drawings in which they occur.

In the drawings:

The reference numeral 10 indicates one end portion of a driving shaft driven by an internal combustion engine or a prime mover, not shown, having a variable pitch drive pulley 12 mounted thereon for gripping opposite side surfaces of a V-belt 14 by varying the spacing between the pulley faces 15 and 16 in accordance with the angular rate of rotation of the driving shaft 10 by movement of the pulley flange 18 toward the stationary pulley flange 20. The stationary or first pulley flange 20 includes an axial hub portion 22 which is threadedly connected with the driving shaft 10 and forms an elongated externally threaded extension 24 projecting coaxially beyond the driving shaft 10. The pulley hub 22, adjacent the first pulley flange face 15, is provided with a bearing seat 26 for receiving a ball bearing 28, or the like, for rollably supporting the V-belt 14 when the drive shaft is rotating the engine at idling speeds.

A double sleeve-like bearing race 29 having an outer wall 30, square in general configuration, forming planar or platform surfaces 32, 34, 36 and 38 (FIG. 2) disposed at right angular relation loosely surrounds the hub extension 24. The race includes a circular portion 39 adjacent the bearing 28 which is surrounded by the second pulley flange 18 and further includes an inner circular or sleeve wall 40 integrally joined, at one end, to the circular end portion 39 of the outer wall 30 adjacent the bearing 28 and being internally threaded for engagement with the hub extension 24. Obviously the race 29 may be secured to the hub 22 or shaft 10 in other ways, such as a close tolerance press fit. A plurality of rolling bearing assemblies, four in the example shown, 42, 44, 46 and 48, one for each of the race platform surfaces 32, 34, 36 and 38, each comprising a rectangular bearing support 50 is rigidly connected at one end to the face of the second pulley flange 18 opposite its face 16 and longitudinally aligned with the axis of the hub extension 24 in overlying close relation with respect to the respective race surface 32, 34, 36 and 38. Two pairs of roller or ball bearings 52 are mounted by bolts and nuts 54 on respective opposing sides of the bearing supports 50 in longitudinally spaced relation with a portion of the periphery of each bearing 52 contacting the respective race surface thus supporting the second pulley flange 18 for movement toward and away from the stationary pulley flange 20.

A helical spring 56 surrounds the hub extension 24 within the race wall 30 and bears against a pressure plate 58 secured to the ends of the bearing supports 50 by bolts 59 opposite the pulley flange 18 and normally urges the pulley halves apart. Such movement being limited by a cup-like housing 60 coaxially secured by a stud bolt 62 to the hub extension 24 and having an arcuate cam surface forming wall 64 projecting toward the face of the pulley flange 18 opposite the pulley flange 20 in spaced surrounding relation with respect to the bearing means 42, 44, 46 and 48.

At least two flyweight assemblies 66 are secured to diametrically opposite bearing assemblies, for example, the assemblies 44 and 48. Each of the flyweight assemblies comprise a pair of arms 68 pivotally secured by a bolt 70 to opposing sides of the respective bearing support 50 at its end portion opposite the pulley flange 18 and which project toward the adjacent surface of the pulley flange for journalling a flyweight 72 therebetween secured by a bolt 74. The flyweights 72 are cylindrical in general configuration for rolling contact by their respective periphery with the cam surface 64. A portion of the respective bearing support 50 is cut away, as at 76, for nesting a peripheral portion of the respective flyweight when in engine idle position.

OPERATION

At normal engine idling speeds angular rotation of the driving shaft 10 is rotating the clutch in the position shown by FIGS. 1 and 3 wherein the resistance of the spring 56 maintains the pulley halves in spaced-apart relation so that the V-belt 14, in a slackened condition, is supported by the bearing 28. As angular rotation of the driving shaft 10 is increased, the flyweight assemblies 66 are forced outwardly by centrifugal force so that a portion of the periphery of each flyweight 72 contacts the cam surface 64 and overcomes the resistance of the spring 56 to move the pulley flange 18 toward the first flange 20 wherein the bearing assemblies 42, 44, 46 and 48 are supported by the bearings 52 rolling along the respective sleeve surfaces 32, 34, 36 and 38 so that the pulley surfaces 15 and 16, by gripping opposite sides of the V-belt 14, drives the latter and progressively moves it outward with respect to the axis of the driving shaft 10 thus generating a variable pitch drive proportional to the angular rate of rotation of the driving shaft 10. Similarly, as the angular rate of rotation of the driving shaft decreases a resulting decrease of centrifugal force allows the spring 56 to bias the pulley flange 18 toward its engine idling position.

Obviously the invention is susceptible to changes or alterations without defeating its practicability, therefore, I do not wish to be confined to the preferred embodiment shown in the drawings and described herein.

I claim:
1. A centrifugal clutch assembly, comprising:
a drive shaft;
a first pulley flange mounted on said shaft for rotation therewith;
a second pulley flange axially opposite said first pulley flange, said first and second pulley flanges having confronting conical faces which cooperate to form a V-belt groove;
bearing means mounting said second pulley flange for movement toward and away from said first pulley flange,
said bearing means including a race means coaxially secured to said shaft for rotation therewith,
said race means having a plurality of outer surfaces forming longitudinal platforms extending parallel with the axis of said shaft,
a bearing support connected with said second flange and overlying the respective said race means platform, and,
antifriction bearings secured to and supporting each said bearing support in spaced relation with respect to the respective platform surface;
a pressure plate extending between and secured to said bearing supports opposite said second pulley flange;
spring means interposed between said race means and said pressure plate and normally biasing said second pulley flange away from said first pulley flange;
housing means surrounding said bearing means and axially connected for rotation with said shaft,
said housing means having a wall surface curving arcuately toward said second pulley flange and forming a cam surface; and,
flyweights pivotally secured to said bearing supports and being contrifugally biased outwardly above predetermined angular rates of rotation of said drive shaft into contact with said cam surface for forcing said second pulley flange toward said first pulley flange.
2. The clutch assembly according to claim 1 in which said first pulley flange is provided with a hub forming an extension of said drive shaft.
3. The clutch assembly according to claim 2 in which the platform forming surface of said race means is square in transverse section.
4. The clutch assembly according to claim 3 in which each said bearing support is rectangular in general configuration, and,
said antifriction bearings comprises two pairs of ball bearings respectively secured to opposing side surfaces of the respective bearing support.

* * * * *